United States Patent
Akkarakaran et al.

(10) Patent No.: US 11,259,334 B2
(45) Date of Patent: Feb. 22, 2022

(54) CODE-BLOCK-BASED COMMUNICATION FOR RANDOM ACCESS CHANNEL

(71) Applicant: QUALCOMM Incorporated, San Diego, CA (US)

(72) Inventors: Sony Akkarakaran, Poway, CA (US); Xiaoxia Zhang, San Diego, CA (US); Tao Luo, San Diego, CA (US); Jing Sun, San Diego, CA (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/738,672

(22) Filed: Jan. 9, 2020

(65) Prior Publication Data

US 2020/0245368 A1   Jul. 30, 2020

Related U.S. Application Data

(60) Provisional application No. 62/798,866, filed on Jan. 30, 2019.

(51) Int. Cl.
*H04W 74/08* (2009.01)
*H04L 1/00* (2006.01)
*H04L 1/18* (2006.01)

(52) U.S. Cl.
CPC ....... *H04W 74/0833* (2013.01); *H04L 1/0061* (2013.01); *H04L 1/1861* (2013.01)

(58) Field of Classification Search
CPC ............. H04W 74/0833; H04L 1/0061; H04L 1/1861; H04L 1/1829; H04L 1/0052; H04L 1/0045
See application file for complete search history.

(56) References Cited

U.S. PATENT DOCUMENTS

| | | | |
|---|---|---|---|
| 2018/0145703 A1 | 5/2018 | Li et al. | |
| 2019/0173615 A1* | 6/2019 | Andersson | H04L 1/0063 |
| 2019/0191487 A1* | 6/2019 | Kwon | H04L 1/1819 |
| 2019/0207734 A1* | 7/2019 | Yang | H04L 1/1819 |
| 2020/0145142 A1* | 5/2020 | Yoshimura | H04L 1/0061 |
| 2020/0235759 A1* | 7/2020 | Ye | H03M 13/116 |

(Continued)

OTHER PUBLICATIONS

International Search Report and Written Opinion—PCT/US2020/013062—ISA/EPO—dated Apr. 30, 2020.

(Continued)

*Primary Examiner* — Min Jung
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment (UE) may receive a transport block that includes one or more code blocks carrying a random access channel (RACH) communication directed to the UE. The transport block may be segmented into the one or more code blocks based at least in part on a segmentation procedure specific to a RACH procedure. The user equipment may decode the one or more code blocks based at least in part on a code block cyclic redundancy check (CRC) associated with the one or more code blocks. Numerous other aspects are provided.

30 Claims, 12 Drawing Sheets

(56) References Cited

U.S. PATENT DOCUMENTS

2020/0328848 A1* 10/2020 He ........................ H04L 1/1854

OTHER PUBLICATIONS

LG Electronics: "Channel Access Procedure for NR Unlicensed Operation", 3GPP Draft; R1-1812560, 3rd Generation Partnership Project (3GPP), Mobile Competence Centre; 650, Route Des Lucioles; F-06921 Sophia-Antipolis Cedex; France, vol. RAN WG1, No. Spokane, US; Nov. 12, 2018-Nov. 16, 2018 Nov. 11, 2018 (Nov. 11, 2018), XP051554505, 8 pages, retrieved from the Internet URL: http://www.3gpp.org/ftp/Meetings%5F3GPP%5FSYNC/RAN1/Docs/R1%2D1812560%2Ezip [retrieved on Nov. 11, 2018].

LG Electronics: "Potential Solutions for NR Unlicensed Operation", 3GPP Draft; R1-1802239, 3rd Generation Partnership Project (3GPP), Mobile Competence Centre; 650, Route Des Lucioles; F-06921 Sophia-Antipolis Cedex; France, vol. RAN WG1. No. Athens, Greece; Feb. 26, 2018-Mar. 2, 2018 Feb. 16, 2018 (Feb. 16, 2018), XP051397245, 8 pages, Retrieved from the Internet: URL: http://www.3gpp.org/ftp/tsg%5Fran/WG1%5FRL1/TSGR1%5F92/Docs/ [retrieved on Feb. 16, 2018] p. 2, section 3 "Channel access procedure (CAP)".

Wilus Inc: "Channel Access Procedures tor NR-U Operation", 3GPP Draft; R1-1901007_Channel Access for NR-U Final, 3rd Generation Partnership Project (3GPP), Mobile Competence Centre; 650, Route Des Lucioles; F-06921 Sophia-Antipolis Cedex ; France, vol. RAN WG1. No. Taipei, Taiwan; Jan. 21, 2019-Jan. 25, 2019 Jan. 20, 2019 (Jan. 20, 2019), XP051593852, 4 pages, Retrieved from the Internet: URL: http://www.3gpp.org/ftp/Meetings%5F3GPP%5FSYNC/RAN1/Docs/R1%2D1901007%2Ezip [retrieved on Jan. 20, 2019].

* cited by examiner

CODE-BLOCK-BASED COMMUNICATION FOR RANDOM ACCESS CHANNEL

CROSS-REFERENCE TO RELATED APPLICATION

This application claims priority to U.S. Provisional Application No. 62/798,866, filed on Jan. 30, 2019, entitled "CODE-BLOCK-BASED COMMUNICATION FOR RANDOM ACCESS CHANNEL," which is hereby expressly incorporated by reference herein.

FIELD OF THE DISCLOSURE

Aspects of the present disclosure generally relate to wireless communication, and to techniques and apparatuses for code-block-based communication for random access channel (RACH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

In some cases, a UE attempting to access a wireless network may receive a random access channel (RACH) communication (for example, a msgB communication, a msg2 communication, a msg4 communication, or the like, or a combination thereof) in a transport block that may include other types of communications directed to other UEs. While only a portion of the transport block may be directed to the UE, the UE may still have to decode the entire transport block in order to decode and read the RACH communication. This increases the amount of processing and memory resources that the UE expends on decoding the RACH communication, and increases the amount of time required for the UE to perform the decoding. Moreover, if the UE is unable to decode a portion of the transport block, the entire transport block may need to be retransmitted to the UE so that the UE can successfully decode and read the RACH communication.

SUMMARY

In some aspects, a method of wireless communication, performed by a user equipment (UE), may include receiving a transport block that includes one or more code blocks carrying a random access channel (RACH) communication directed to the UE, the transport block being segmented into the one or more code blocks based at least in part on a segmentation procedure specific to a RACH procedure. The method may include decoding the one or more code blocks based at least in part on a code block cyclic redundancy check (CRC) associated with the one or more code blocks.

In some aspects, a UE for wireless communication may include memory and one or more processors operatively coupled to the memory. The memory and the one or more processors may be configured to receive a transport block that includes one or more code blocks carrying a RACH communication directed to the UE, the transport block being segmented into the one or more code blocks based at least in part on a segmentation procedure specific to a RACH procedure. The memory and the one or more processors may be configured to decode the one or more code blocks based at least in part on a code block CRC associated with the one or more code blocks.

In some aspects, a non-transitory computer-readable medium may store one or more instructions for wireless communication. The one or more instructions, when executed by one or more processors of a UE, may cause the one or more processors to receive a transport block that includes one or more code blocks carrying a RACH communication directed to the UE, the transport block being segmented into the one or more code blocks based at least in part on a segmentation procedure specific to a RACH procedure. The one or more instructions, when executed by one or more processors of a UE, may cause the one or more processors to decode the one or more code blocks based at least in part on a code block CRC associated with the one or more code blocks.

In some aspects, an apparatus for wireless communication may include means for receiving a transport block that includes one or more code blocks carrying a RACH communication directed to the apparatus, the transport block being segmented into the one or more code blocks based at least in part on a segmentation procedure specific to a RACH procedure. The apparatus may include means for decoding the one or more code blocks based at least in part on a code block CRC associated with the one or more code blocks.

In some aspects, a method of wireless communication, performed by a base station (BS), may include segmenting, based at least in part on a segmentation procedure specific to a RACH procedure, a transport block into a plurality of code blocks. The method may include configuring one or more code blocks, of the plurality of code blocks, to carry a RACH communication directed to a UE. The method may include transmitting the transport block to the UE.

In some aspects, a BS for wireless communication may include memory and one or more processors operatively coupled to the memory. The memory and the one or more processors may be configured to segment, based at least in part on a segmentation procedure specific to a RACH procedure, a transport block into a plurality of code blocks. The memory and the one or more processors may be configured to configure one or more code blocks, of the plurality of code blocks, to carry a RACH communication directed to a UE. The memory and the one or more processors may be configured to transmit the transport block to the UE.

In some aspects, a non-transitory computer-readable medium may store one or more instructions for wireless communication. The one or more instructions, when executed by one or more processors of a B S, may cause the one or more processors to segmenting, based at least in part on a segmentation procedure specific to a RACH procedure, a transport block into a plurality of code blocks. The memory and the one or more processors may be configured to configure one or more code blocks, of the plurality of code blocks, to carry a RACH communication directed to a UE. The memory and the one or more processors may be configured to transmit the transport block to the UE.

In some aspects, an apparatus for wireless communication may include means for segmenting, based at least in part on a segmentation procedure specific to a RACH procedure, a transport block into a plurality of code blocks. The apparatus may include means for configuring one or more code blocks, of the plurality of code blocks, to carry a RACH communication directed to a UE. The apparatus may include means for transmitting the transport block to the UE.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
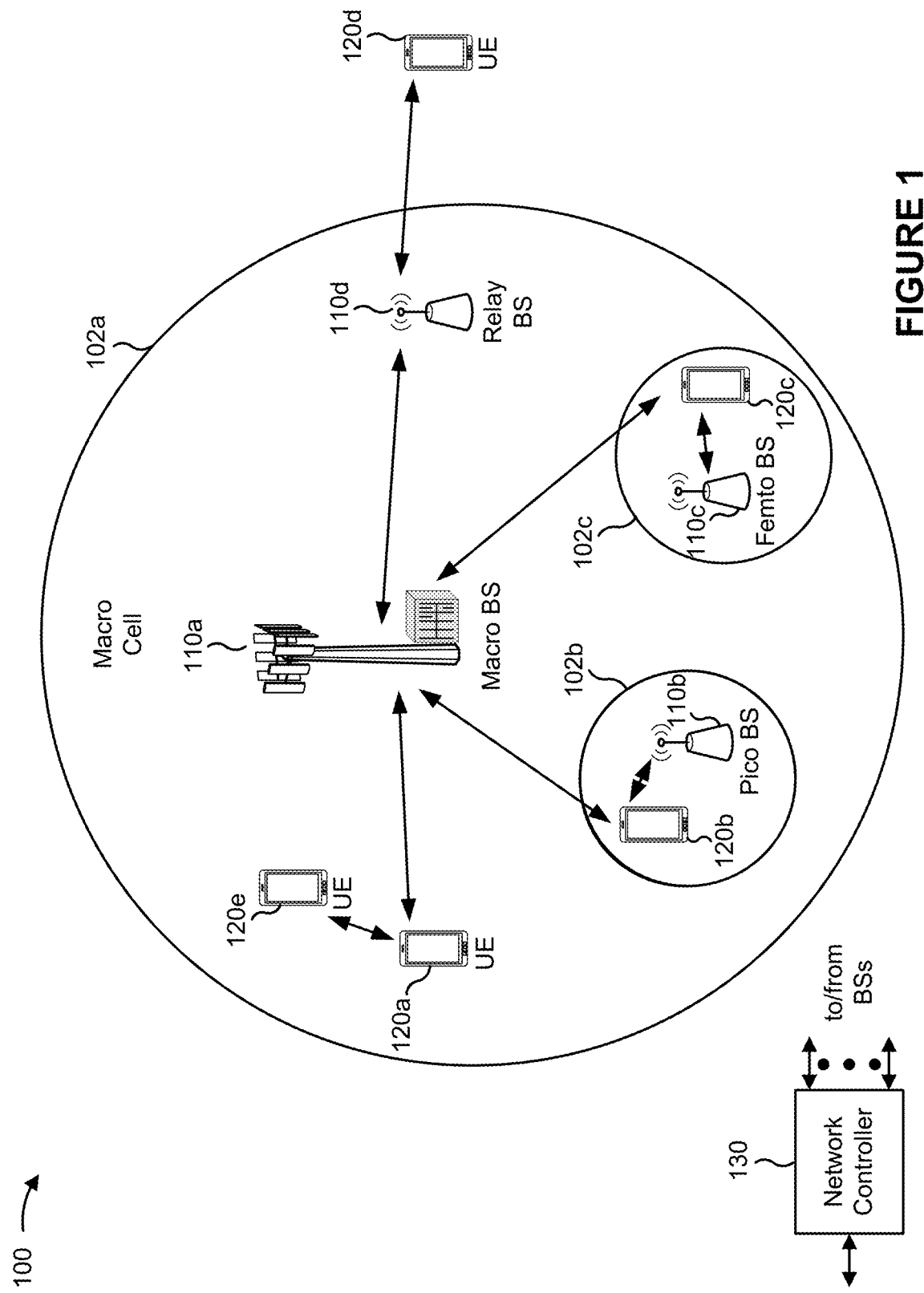
FIG. 1 is a block diagram illustrating an example wireless network in accordance with various aspects of the present disclosure.

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to a person having ordinary skill in the art. Based on the teachings herein, a person having ordinary skill in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or a combination thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including New Radio (NR) technologies.

A use equipment (UE) may receive a random access channel (RACH) communication (for example, a message B (msgB) communication, a message 2 (msg2) communication, a message 4 (msg4) communication, or the like, or a combination thereof) in a transport block that may include other types of communications directed to other UEs. However, the UE may still have to decode the entire transport block in order to decode and read the RACH communication, which increases the amount of processing or memory resources that the UE expends on decoding the RACH communication, and increases the amount of time required for the UE to perform the decoding. Moreover, if the UE is unable to decode a portion of the transport block, the BS may need to retransmit the entire transport block to the UE so that the UE can successfully decode and read the RACH communication.

Some aspects of the present disclosure described herein provide techniques and apparatuses for code-block-based communication for RACH. In some aspects, a BS may segment, based at least in part on a segmentation procedure specific to a RACH procedure, a transport block into a plurality of code blocks. The BS may configure one or more code blocks, of the plurality of code blocks, to carry a RACH communication directed to a UE and may transmit the transport block to the UE. The one or more code blocks may be segmented in a way that permits the UE to perform code-block-based decoding (that is, the UE may decode individual code blocks to decode an entire RACH communication).

Particular implementations of the subject matter described in this disclosure can be implemented to realize one or more of the following potential advantages. The techniques described herein permit a UE to decode the transport block at the code block level to identify the one or more code blocks carrying a RACH communication directed to the UE. This reduces the amount of information that the UE actually decodes in order to decode the RACH communication, which, in turn, decreases the amount of time required for the UE to decode the RACH communication, and also increases the likelihood of successful decoding, since every code block does not always need to be successfully decoded. The techniques described herein permit the UE to provide hybrid automatic repeat request (HARM) feedback at the code block level such that the BS may retransmit individual code blocks, instead of the entire transport block, if the UE is unable to decode certain code blocks in the transport block. This method of providing feedback reduces the amount of networking, processing, and memory resources that are used for the retransmissions.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a number of base stations (BSs) 110 (shown as BS 110a, BS 110b, BS 110c, and BS 110d) and other network entities. A BS is an entity that communicates with user equipment (UE(s)) via a downlink and an uplink. The downlink (or forward link) refers to the communication link from the BS to the UE, and the uplink (or reverse link) refers to the communication link from the UE to the BS. A BS and may also be referred to as a Node B, an eNodeB, an eNB, a gNB, a NR BS, a 5G node B (NB), an access point (AP), a transmit receive point (TRP), or the like, or a combination thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or a combination thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not necessarily be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or a combination thereof using any suitable transport network.

Wireless network 100 may also include relay stations. A relay station is an entity that can receive a transmission of data from an upstream station (for example, a BS or a UE)

and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or a combination thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or a combination thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or a combination thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or a combination thereof.

In general, any number of wireless networks may be deployed in a given geographic area. Each wireless network may support a particular radio access technology (RAT) and may operate on one or more frequencies or frequency channels. A frequency may also be referred to as a carrier or the like, or a combination thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or a combination thereof), a mesh network, or the like, or a combination thereof. In this case, the UE 120 may perform scheduling operations, resource selection operations, or other operations described elsewhere herein as being performed by the base station 110.

Figure 2:
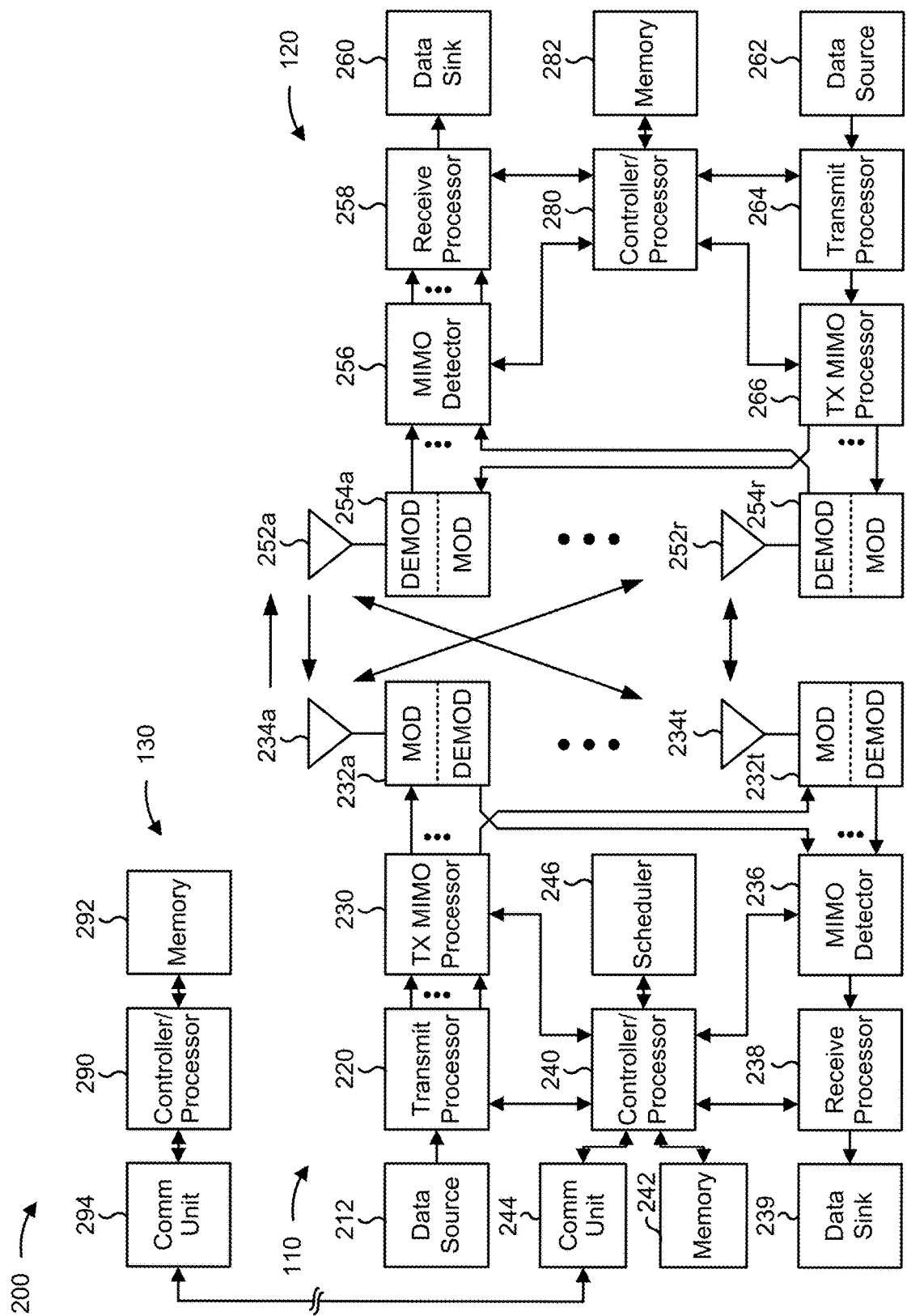
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or a combination thereof) and control information (for example, CQI requests, grants, upper layer signaling, or the like, or a combination thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or a combination thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or a combination thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or a combination thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or a combination thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or a combination thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with code-block-based communication for random access channel (RACH), as described in more detail elsewhere herein. For example, controller/processor 240 of base station 110, controller/processor 280 of UE 120, or any other component(s) of FIG. 2 may perform or direct operations of, for example, process 1000 of FIG. 10, process 1100 of FIG. 11, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a transport block that includes one or more code blocks carrying a RACH communication directed to the UE 120, the transport block being segmented into the one or more code blocks based at least in part on a segmentation procedure specific to a RACH procedure, means for decoding the one or more code blocks based at least in part on a code block CRC associated with the one or more code blocks, or the like, or a combination thereof. In some aspects, such means may include one or more components of UE 120 described in connection with FIG. 2.

In some aspects, base station 110 may include means for segmenting, based at least in part on a segmentation procedure specific to a RACH procedure, a transport block into a plurality of code blocks, means for configuring one or more code blocks, of the plurality of code blocks, to carry a RACH communication directed to a UE 120, means for transmitting the transport block to the UE 120, or the like, or a combination thereof. In some aspects, such means may include one or more components of base station 110 described in connection with FIG. 2.

Figure 3A:
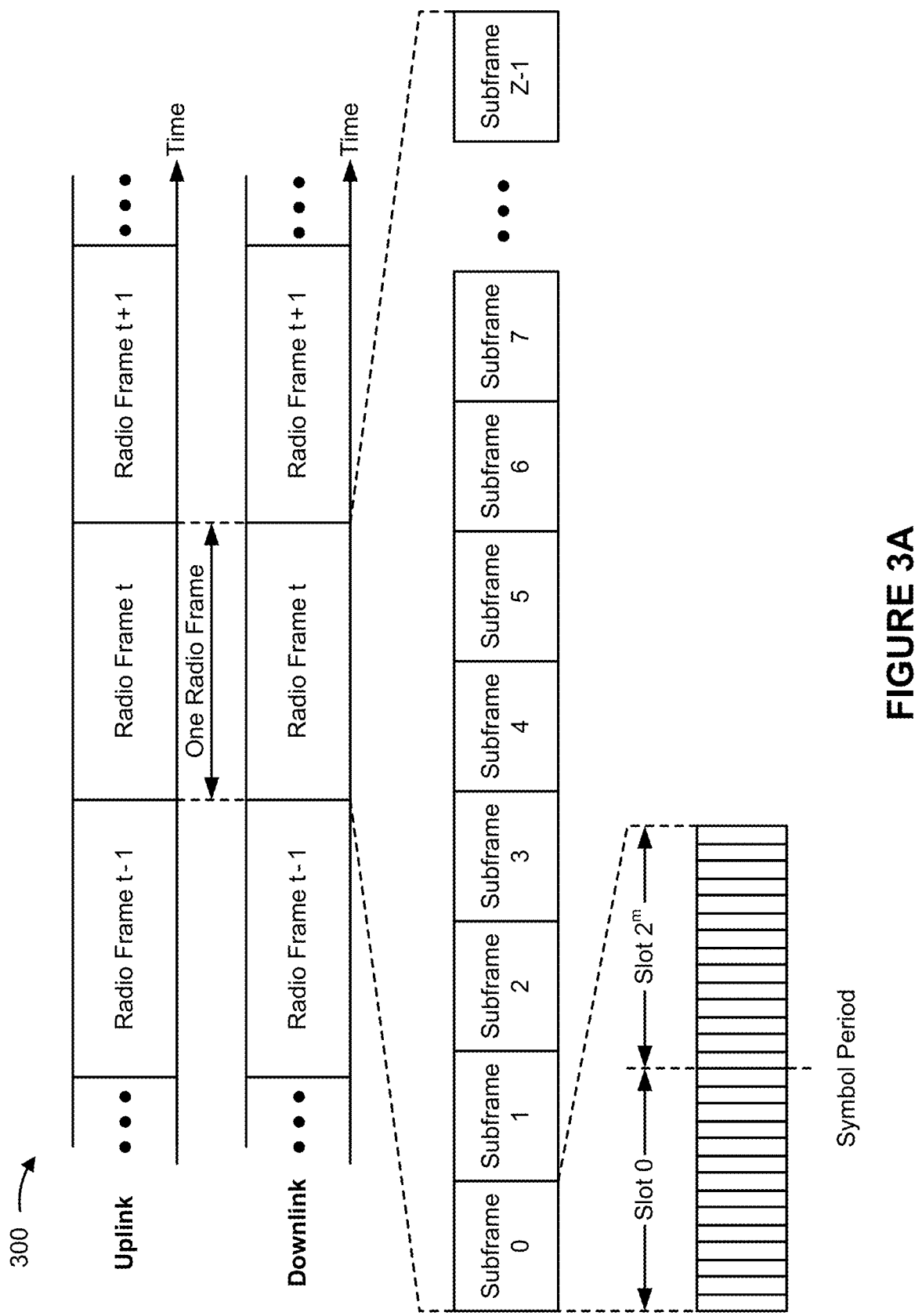
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, or the like, or a combination thereof). Each slot may include a set of L symbol periods. For example, each slot may include fourteen symbol periods (for example, as shown in FIG. 3A), seven symbol periods, or another number of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like, or a combination thereof.

While some techniques are described herein in connection with frames, subframes, slots, or the like, or a combination thereof, these techniques may equally apply to other types of wireless communication structures, which may be referred to using terms other than "frame," "subframe," "slot," or the like, or a combination thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In certain telecommunications (for example, NR), a base station may transmit synchronization signals. For example, a base station may transmit a primary synchronization signal (PSS), a secondary synchronization signal (SSS), or the like, or a combination thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. In some aspects, a base station may transmit a PBCH such that the PBCH occupies the space above and below the SSS. In this case, the SSS and PBCH may form a three-OFDM-symbol rectangular grid.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
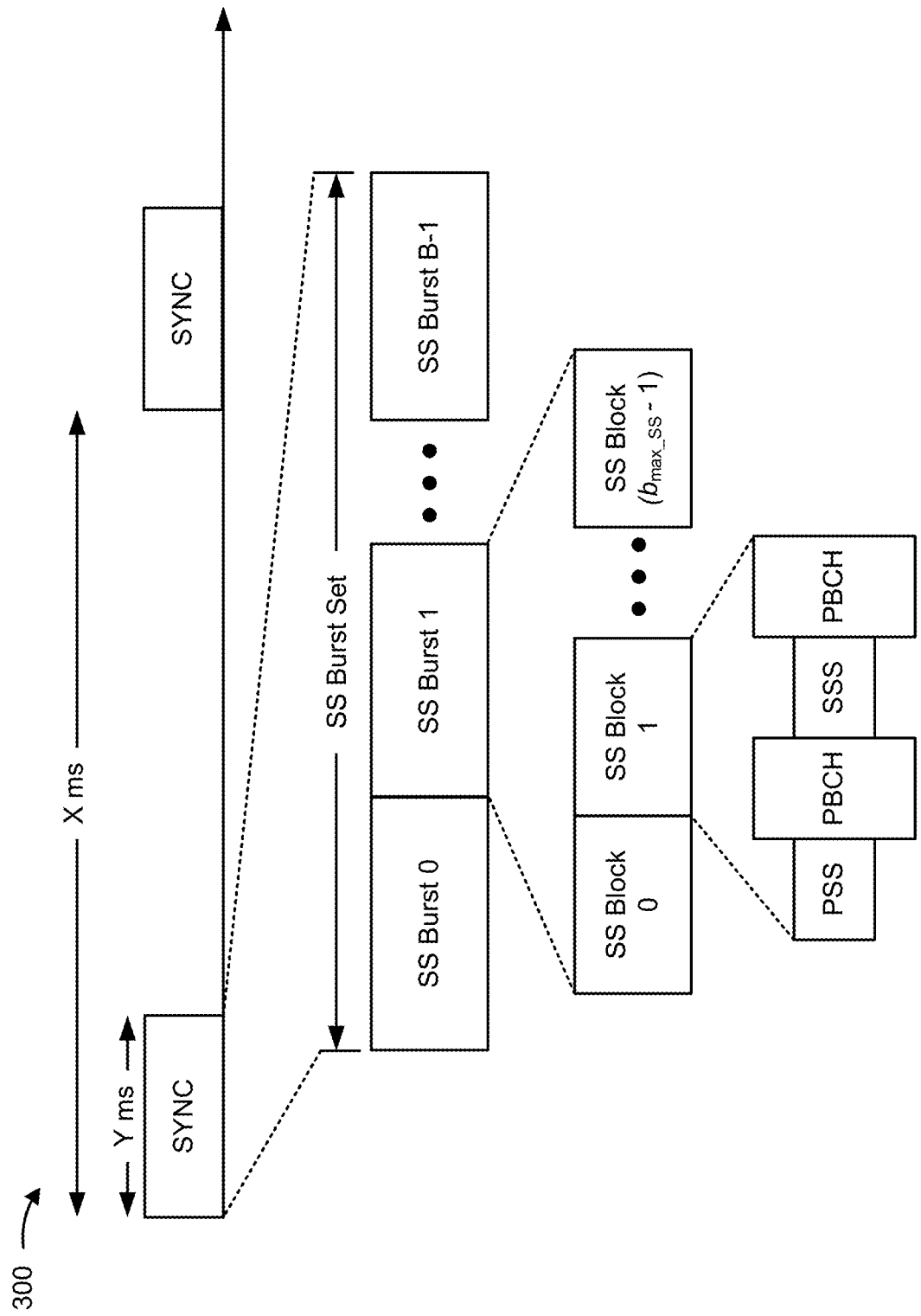
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBS) on a physical downlink shared channel (PDSCH) in certain slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
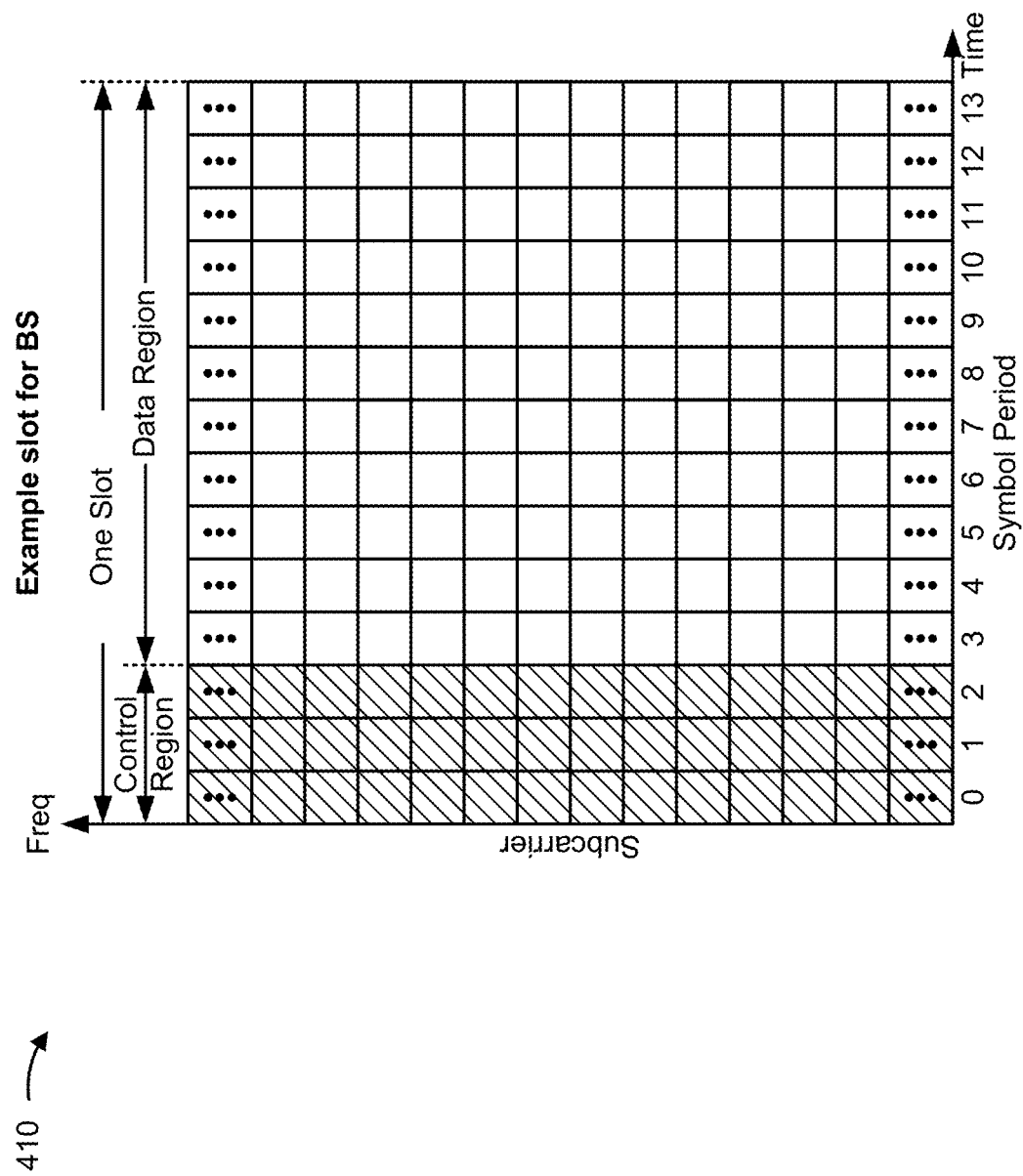
FIG. 4 is a block diagram illustrating an example slot format in accordance with various aspects of the present disclosure.

FIG. 4 is a block diagram 400 conceptually illustrating an example slot format 410 in accordance with various aspects of the present disclosure. The available time frequency resources may be partitioned into resource blocks. Each resource block may cover a set of subcarriers (for example, 12 subcarriers) in one slot and may include a number of resource elements. Each resource element may cover one subcarrier in one symbol period (for example, in time) and may be used to send one modulation symbol, which may be a real or complex value.

An interlace structure may be used for each of the downlink and uplink for FDD in certain telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, or the like, or a combination thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such as central units or distributed units.

Figure 5:
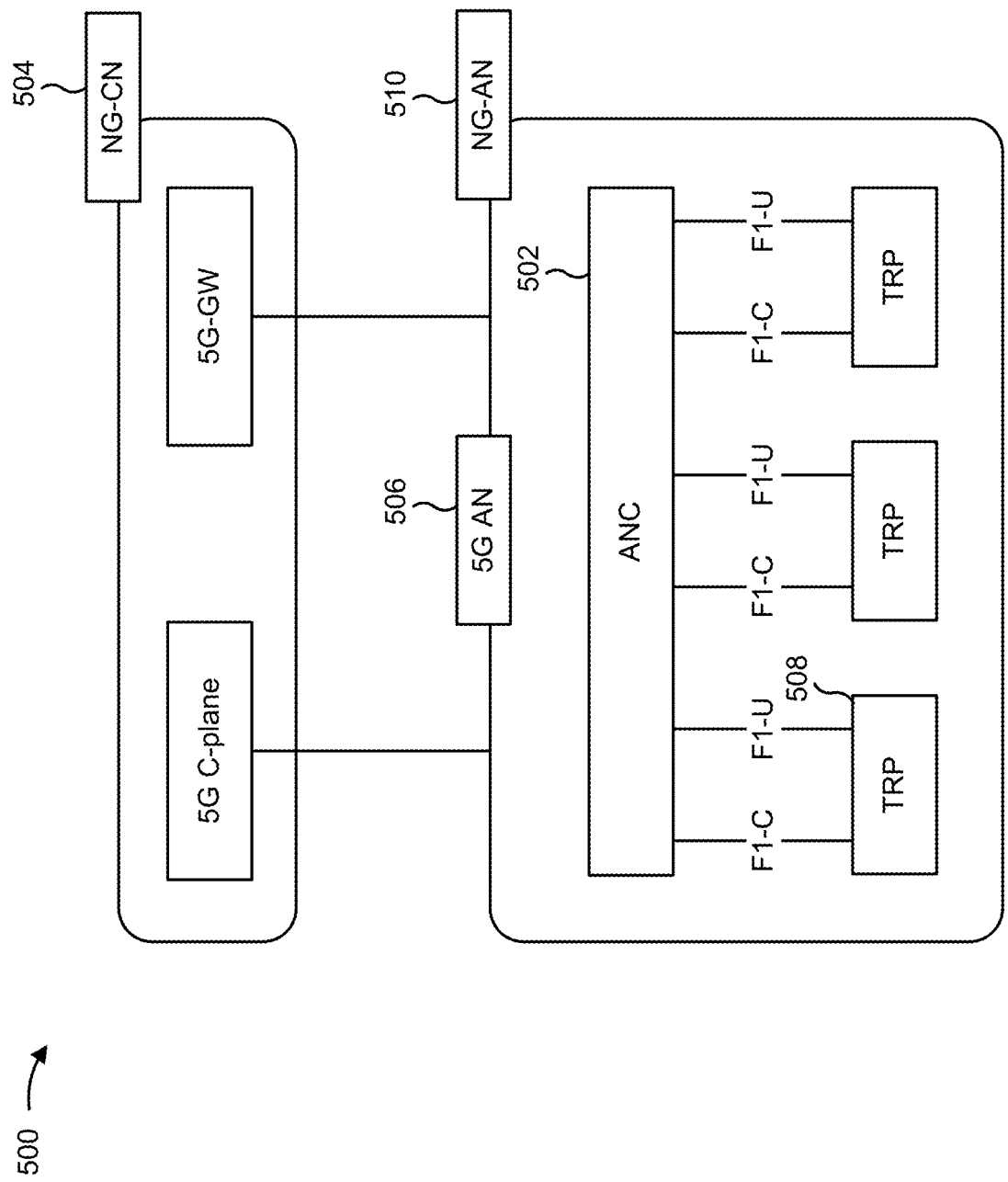
FIG. 5 illustrates an example logical architecture of a distributed radio access network (RAN) in accordance with various aspects of the present disclosure.

FIG. 5 illustrates an example logical architecture of a distributed radio access network (RAN) 500, in accordance with various aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) 510 may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 500 may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In accordance with aspects, NG-AN 510 may support dual connectivity with NR. NG-AN 510 may share a common fronthaul for LTE and NR.

The architecture may enable cooperation between and among TRPs 508. For example, cooperation may be preset within a TRP or across TRPs via the ANC 502. In accordance with aspects, no inter-TRP interface may be needed/present.

In accordance with aspects, a dynamic configuration of split logical functions may be present within the architecture of RAN 500. The packet data convergence protocol (PDCP), radio link control (RLC), and MAC protocol layers may be adaptably placed at the ANC or TRP.

Figure 6:
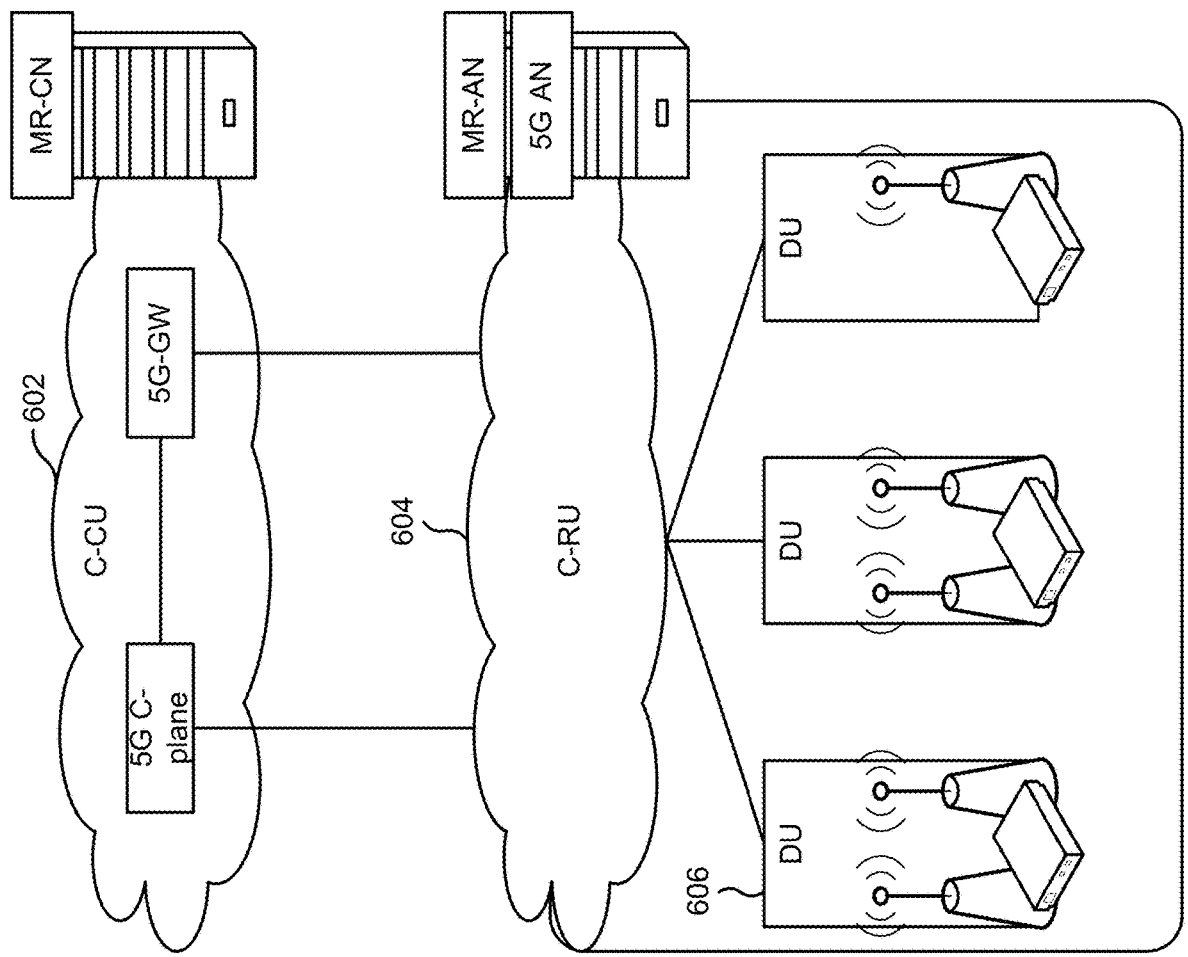
FIG. 6 illustrates an example physical architecture of a distributed RAN in accordance with various aspects of the present disclosure.

FIG. 6 illustrates an example physical architecture of a distributed RAN 600 in accordance with various aspects of the present disclosure. A centralized core network unit (C-CU) 602 may host core network functions. The C-CU may be centrally deployed. C-CU functionality may be offloaded (for example, to advanced wireless services (AWS)), in an effort to handle peak capacity. A centralized RAN unit (C-RU) 604 may host one or more ANC functions. Optionally, the C-RU may host core network functions locally. The C-RU may have distributed deployment. The C-RU may be closer to the network edge. A distributed unit (DU) 606 may host one or more TRPs. The DU may be located at edges of the network with radio frequency (RF) functionality.

Figure 7:
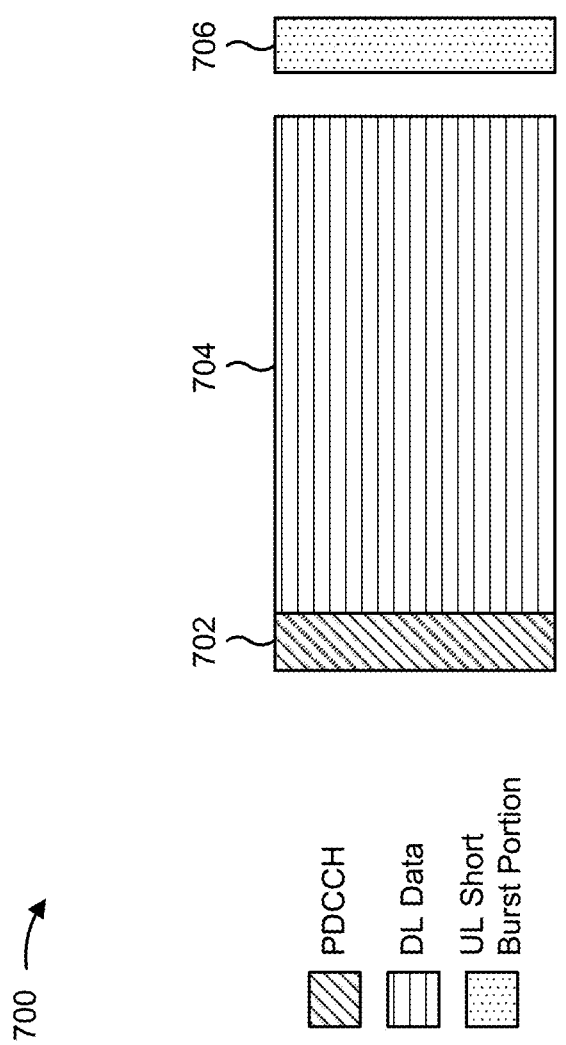
FIG. 7 is a diagram showing an example downlink (DL)-centric slot or communication structure in accordance with various aspects of the present disclosure.

FIG. 7 is a diagram showing an example downlink (DL)-centric slot 700 or communication structure in accordance with various aspects of the present disclosure. The DL-centric slot (or wireless communication structure) may include a control portion 702 during which the scheduling entity (for example, UE or BS) transmits various scheduling information or control information corresponding to various portions of the DL-centric slot to the subordinate entity (for example, UE). The control portion 702 may exist in the initial or beginning portion of the DL-centric slot. In some configurations, the control portion 702 may be a physical DL control channel PDCCH, as indicated in FIG. 7. In some aspects, the control portion 702 may include legacy PDCCH information, shortened PDCCH (sPDCCH) information), a control format indicator (CFI) value (for example, carried on a physical control format indicator channel (PCFICH)), one or more grants (for example, downlink grants, uplink grants, or the like, or a combination thereof), or the like, or a combination thereof.

The DL-centric slot may also include a DL data portion 704 during which the scheduling entity (for example, UE or BS) transmits DL data to the subordinate entity (for example, UE) using communication resources utilized to communicate DL data. The DL data portion 704 may sometimes be referred to as the payload of the DL-centric slot. In some configurations, the DL data portion 704 may be a PDSCH.

The DL-centric slot may also include an UL short burst portion 706 during which the subordinate entity (for example, UE) transmits reference signals or feedback to the scheduling entity (for example, UE or BS) using communication resources utilized to communicate UL data. The UL short burst portion 706 may sometimes be referred to as an UL burst, an UL burst portion, a common UL burst, a short burst, an UL short burst, a common UL short burst, a common UL short burst portion, or various other suitable terms. In some aspects, the UL short burst portion 706 may include one or more reference signals. Additionally or alternatively, the UL short burst portion 706 may include feedback information corresponding to various other portions of the DL-centric slot. For example, the UL short burst portion 706 may include feedback information corresponding to the control portion 702 or the data portion 704. Non-limiting examples of information that may be included in the UL short burst portion 706 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, or various other suitable types of information. The UL short burst portion 706 may include additional or alternative information, such as information pertaining to RACH procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without necessarily deviating from the aspects described herein.

Figure 8:
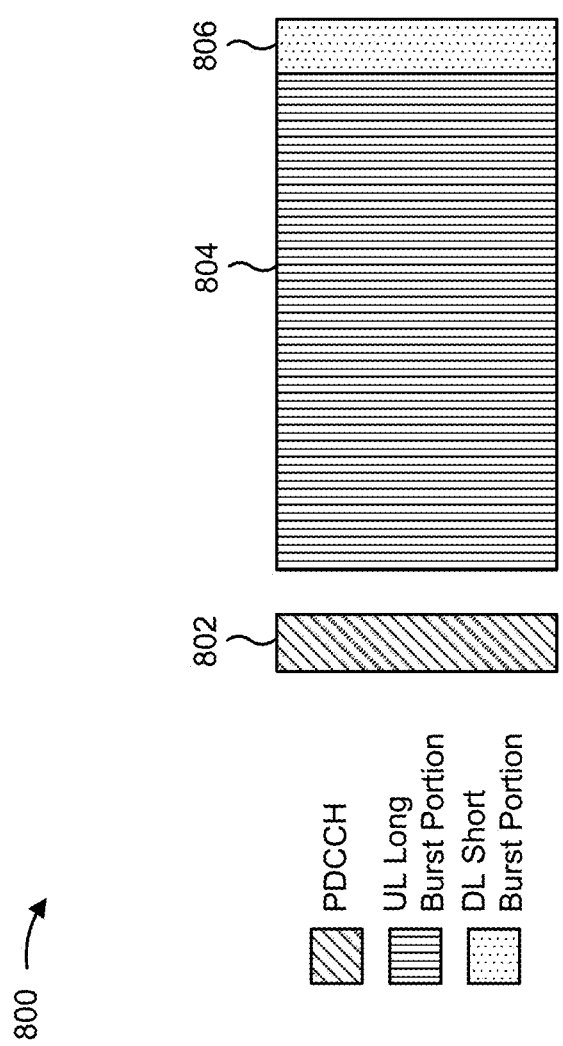
FIG. 8 is a diagram showing an example uplink (UL)-centric slot or communication structure in accordance with various aspects of the present disclosure.

FIG. 8 is a diagram showing an example uplink (UL)-centric slot 800 or communication structure in accordance with various aspects of the present disclosure. The UL-centric slot (or wireless communication structure) may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (for example, UE) to the scheduling entity (for example, UE or B S). In some configurations, the control portion 802 may be a physical DL control channel PDCCH.

As illustrated in FIG. 8, the end of the control portion 802 may be separated in time from the beginning of the UL long burst portion 804. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot may also include a DL short burst portion 806. The DL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (for example, UEs) may communicate with each other using sidelink signals. Real-world applications of such sidelink communications may include public safety, proximity services, UE-to-network relaying, V2V communications, Internet of Everything (IoE) communications, IoT communications, mission-critical mesh, or various other suitable applications. Generally, a sidelink signal may refer to a signal communicated from one subordinate entity (for example, UE1) to another subordinate entity (for example, UE2) without relaying that communication through the scheduling entity (for example, UE or BS), even though a scheduling entity may be utilized for scheduling or control purposes. In some aspects, the sidelink signals may be communicated using a licensed spectrum band; in other aspects, the sidelink signals may be communicated using an unlicensed spectrum band.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

A UE may access a wireless network by negotiating a connection with a BS of the wireless network. During connection establishment, the UE and the BS may synchronize the connection in the downlink direction (that is, from BS to UE) and in the uplink direction (that is, from UE to BS).

To synchronize the connection in the downlink direction, the UE may read a synchronization signal block (SSB) that includes various synchronization signals transmitted from the BS. The synchronization signals may include a PSS, an SSS, or the like, or a combination thereof. The UE may use the PSS to determine symbol timing in the downlink direction, and may use the SSS to determine a physical cell identifier, associated with the BS, and frame timing.

To synchronize the connection in the uplink direction, the UE and the BS may perform a RACH procedure. In some existing schemes, the UE and the BS may perform a four-step RACH procedure. In a four-step RACH procedure, the UE and the BS may exchange four primary RACH communications. First, the UE may transmit a msg1 communication to the BS. The msg1 communication may include a RACH preamble communication. The BS may respond to the msg1 communication with a msg2 communication, which may include a random access response (RAR) communication. The UE may respond to the msg2 communication with a msg3 communication, which may include a radio resource control (RRC) connection request communication. The BS may respond to the msg3 communication with a msg4 communication, which may include a contention resolution identifier medium-access-control control element (MAC-CE), an RRCSetup command, or the like, or a combination thereof.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a communication referred to as a msgA communication. The msg1 portion of the msgA communication may be referred to as the preamble portion of the msgA communication. The msg3 portion of the msgA communication may be referred to as the payload portion of the msgA. The UE may transmit the msg1 portion and the msg3 portion of the msgA communication prior to receiving the msg2 communication and the msg4 communication. The BS may receive the msgA communication and may transmit a msgB communication, which may include the msg2 communication and the msg4 communication.

As explained above, a UE may receive a RACH communication (for example, a msgB communication, a msg2 communication, a msg4 communication, or the like, or a combination thereof) in a transport block that may include other types of communications directed to other UEs. However, the UE may still have to decode the entire transport block in order to decode and read the RACH communication, which increases the amount of processing or memory resources that the UE expends on decoding the RACH communication, and increases the amount of time required for the UE to perform the decoding. Moreover, if the UE is unable to decode a portion of the transport block, the BS may need to retransmit the entire transport block to the UE so that the UE can successfully decode and read the RACH communication.

Some aspects of the present disclosure described herein provide techniques and apparatuses for code-block-based communication for RACH. In some aspects, a BS may segment, based at least in part on a segmentation procedure specific to a RACH procedure, a transport block into a plurality of code blocks. The BS may configure one or more code blocks, of the plurality of code blocks, to carry a RACH communication directed to a UE and may transmit the transport block to the UE. The one or more code blocks may be segmented in a way that permits the UE to perform code-block-based decoding (that is, the UE may decode individual code blocks to decode an entire RACH communication). In this way, the UE may decode the transport block at the code block level to identify the one or more code blocks carrying the RACH communication directed to the UE. This reduces the amount of information that the UE actually decodes in order to decode the RACH communication, which, in turn, decreases the amount of time required for the UE to decode the RACH communication, and also increases the likelihood of successful decoding, since every code block does not always need to be successfully decoded. Moreover, some implementations permit the UE to provide HARQ feedback at the code block level such that the BS may retransmit individual code blocks, instead of the entire transport block, if the UE is unable to decode certain code blocks in the transport block. This method of providing feedback reduces the amount of networking, processing, and memory resources that are used for the retransmissions.

Figure 9:
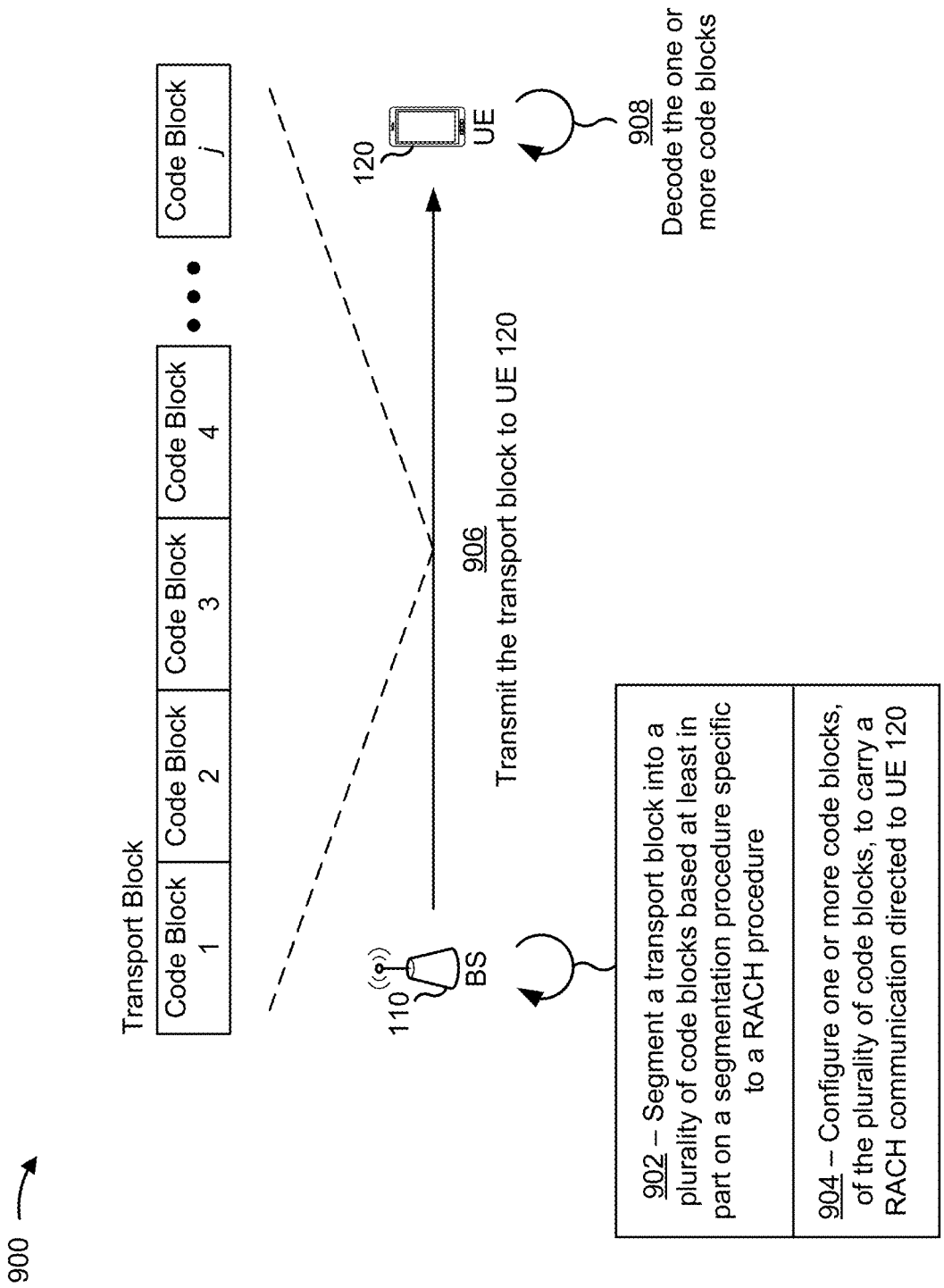
FIG. 9 is a diagram illustrating an example of code-block-based communication for RACH in accordance with various aspects of the present disclosure.

FIG. 9 is a diagram 900 illustrating an example of code-block-based communication for RACH in accordance with various aspects of the present disclosure. As shown in FIG. 9, the example may include communications between a user equipment (for example, UE 120) and a base station (for example, BS 110). In some aspects, BS 110 and UE 120 may be included in a wireless network (for example, wireless network 100).

In some aspects, BS 110 and UE 120 may establish a connection using a RACH procedure, such as a four-step RACH procedure, a two-step RACH procedure, or the like, or a combination thereof. For example, UE 120 may initiate the RACH procedure by transmitting, to BS 110, a msg1 communication in a four-step RACH procedure. As another example, if UE 120 is capable of performing a two-step RACH procedure, UE 120 may transmit, to BS 110, a msgA communication in the two-step RACH procedure.

In some aspects, BS 110 may receive the msg1 communication or msgA communication, and may respond by transmitting a RACH communication to UE 120. In some aspects, the RACH communication may include a msg2 communication if, for example, UE 120 transmitted a msg1 communication. In some aspects, the RACH communication may include a msgB communication if, for example, UE 120 transmitted a msgA communication. In some aspects, BS 110 may generate one or more code blocks (or one or more code block groups) to carry the RACH communication.

As shown in FIG. 9, in a first operation 902, to generate the one or more code blocks, BS 110 may segment a transport block into a plurality of code blocks (for example, Code Block 1 through Code Block j). In some aspects, BS 110 may segment the transport block based at least in part on a segmentation procedure specific to a RACH procedure, such as specific to a four-step RACH procedure or specific to a two-step RACH procedure.

In some aspects, a segmentation procedure specific to a two-step RACH procedure may include one or more segmentation parameters that are different from one or more segmentation parameters associated with a four-step RACH procedure or other segmentation procedures associated with other forms of communication between UE 120 and BS 110. For example, the segmentation procedure specific to the two-step RACH procedure may include a segmentation threshold that is lower relative to a segmentation threshold included in a segmentation procedure specific to a four-step RACH procedure. The segmentation threshold may specify a maximum code block size of the plurality of code blocks into which the transport block may be segmented. In some cases, the segmentation threshold for the four-step RACH procedure may be 8448 bits, 3840 bits, or another threshold quantity of bits that may be included into a code block. The segmentation threshold for the four-step RACH procedure may be too large to permit msgB communications to be segmented into respective code blocks, and thus UE 120 may be unable to perform code-block-based decoding for four-step RACH. The segmentation threshold for the two-step RACH procedure may be relatively lower than the segmentation threshold for the four-step RACH procedure, such as 100 bits, 500 bits, or the like, or a combination thereof. In this way, the segmentation threshold for the two-step RACH procedure may be set such that a msgB communication may be segmented into a single code block. This permits UE 120 to perform code-block-based decoding (that is, UE 120 may decode individual code blocks to decode an entire msgB communication) when a two-step RACH procedure is used.

As further shown in FIG. 9, in a second operation 904, BS 110 may configure one or more code blocks (or one or more code block groups), of the plurality of code blocks included in the transport block, to carry the RACH communication directed to UE 120. As an example, BS 110 may configure Code Block 1 or another code block to carry the RACH communication.

In some aspects, BS 110 may configure the one or more code blocks by incorporating a RAR portion and a MAC-CE contention resolution identifier portion of a msgB communication into the one or more code blocks, or may incorporate a msg2 communication into the one or more code blocks. In some aspects, BS 110 may further configure the one or more code blocks by appending respective code block cyclic redundancy checks (CRC) to the one or more code blocks. In some aspects, if the RACH communication is carried by a code block group, BS 110 may configure the code block group by appending a code block CRC to the code block group.

In some aspects, BS 110 may configure the one or more code blocks to be all the same code block size, and accordingly may add padding (that is, extra bits) to the one or more code blocks in order to ensure that the one or more code blocks are all the same code block size. In some aspects, BS 110 may configure the one or more code blocks to be different code block sizes, which may reduce the amount of padding that is added to the one or more code blocks.

As further shown in FIG. 9, in a third operation 906, BS 110 may transmit the transport block to UE 120. In some aspects, if the RACH communication directed to UE 120 is multiplexed in the transport block along with RACH communications directed to other UEs, BS 110 may transmit the transport block to UE 120 as well as the other UEs.

In some aspects, BS 110 may transmit the transport block on a PDSCH. BS 110 may schedule the PDSCH by transmitting, to UE 120, a PDCCH communication prior to transmitting the PDSCH. The PDCCH communication may include a downlink control information (DCI) communication or another type of signaling communication that includes scheduling information (for example, a scheduling grant) associated with the PDSCH.

In some aspects, the PDCCH communication may further indicate whether the transport block includes only msgB communications (and therefore uses the segmentation procedure associated with the two-step RACH procedure) or whether it includes both msgB communications and msg2 communications (and therefore uses the segmentation procedure associated with the four-step RACH procedure). In this way, the PDCCH communication may indicate, to UE 120, whether BS 110 used the segmentation procedure associated with the two-step RACH procedure, or the segmentation procedure associated with the four-step RACH procedure, to segment the transport block.

In some aspects, the indication may include a particular type of scrambling of the PDCCH communication (for example, using a particular radio network temporary identifier (RNTI)), a particular field or value included in the PDCCH communication, or the like, or a combination thereof. If the transport block includes only msgB communications, BS 110 may configure the indication such that the PDCCH communication can only be descrambled or understood by UEs that are capable of two-step RACH, and such that the PDCCH communication is rejected or ignored by UEs that are not capable of two-step RACH.

In some cases, UE 120 may need to know the code block sizes of the plurality of code blocks in order to decode the plurality of code blocks. Accordingly, the PDCCH communication may further indicate the sizes of the plurality of code blocks included in the transport block. In some aspects, the PDCCH communication may include an indication that the plurality of code blocks all have the same code block size.

In some aspects, the PDCCH communication may include an indication that the plurality of code blocks may be different sizes. In this case, the PDCCH communication may include an indication of the respective code block sizes of the plurality of code blocks. In some aspects, BS 110 may configure the PDCCH communication such that the PDCCH communication explicitly indicates the respective code block sizes. In some aspects, BS 110 may configure the PDCCH communication such that the PDCCH communication selects the respective code block sizes from a set of possible code block sizes indicated in another communication, such as a master information block (MIB) communication transmitted by BS 110 or a remaining minimum system information (RMSI) or SIB1 (system information block-1) communication transmitted by BS 110.

As further shown in FIG. 9, in a fourth operation 908, UE 120 may receive the transport block and may decode the one or more code blocks (or the one or more code block groups) carrying the RACH communication directed to UE 120. In some aspects, UE 120 may decode the one or more code blocks based at least in part on whether the transport block includes only msgB communications or includes both msgB communications and msg2 communications. For example, UE 120 may determine, based at least in part on the PDCCH communication, that the transport block includes msgB communications and msg2 communications, and may therefore decode the one or more code blocks based at least in part on the segmentation procedure specific to the four-step RACH procedure. In this case, UE 120 may decode the entire transport block based at least in part on the segmentation threshold included in a segmentation procedure specific to a four-step RACH procedure. This procedure may be same as the segmentation procedure used during connected mode for uplink and downlink data transmission (for example, on PUSCH and PDSCH).

As another example, UE 120 may determine, based at least in part on the PDCCH communication, that the transport block includes only msgB communications, and may therefore decode the one or more code blocks based at least in part on the segmentation procedure specific to the two-step RACH procedure. In this case, UE 120 may decode individual code blocks of the transport block instead of decoding the entire transport block. UE 120 may decode the one or more code blocks based at least in part on the respective code block sizes, for the plurality of code blocks, indicated in the PDCCH communication.

In some aspects, UE 120 may decode the one or more communications by computing respective code block CRCs (or code block group CRCs) for the one or more code blocks (or the one or more code block groups) and comparing the computed code block CRCs to the code block CRCs appended to the one or more code blocks.

In some aspects, UE 120 may decode code blocks, included in the transport block, until UE 120 identifies the one or more code blocks carrying the RACH communication. For example, UE 120 may decode Code Block 1 by checking a code block CRC appended to Code Block 1, and may determine whether Code Block 1 includes an identifier associated with UE 120, such as a random access preamble identifier (RAPID) associated with UE 120 or another type of identifier. If Code Block 1 does not include an identifier associated with UE 120, UE 120 may determine that Code Block 1 is not directed to UE 120 and may continue to decode code blocks until UE 120 identifies the one or more code blocks carrying the RACH communication directed to UE 120.

In some aspects, if UE 120 and BS 110 have implemented an HARQ process for the RACH process, UE 120 may further transmit a HARQ ACK or HARQ NACK depending on whether UE 120 is able to successfully decode the one or more code blocks (or the one or more code block groups). If UE 120 is unable to decode a code block included in the one or more code blocks, UE 120 may transmit a HARQ NACK identifying the code block so that BS 110 may retransmit the code block instead of the entire one or more code blocks, which reduces the amount of network, processing, and memory resources that are used for HARQ retransmissions.

In this way, BS 110 may segment, based at least in part on a segmentation procedure specific to a RACH procedure, a transport block into a plurality of code blocks, may configure one or more code blocks of the plurality of code blocks to carry a RACH communication directed to UE 120, and may transmit the transport block to the UE 120. UE 120 may receive the transport block and may decode the one or more code blocks to decode the RACH communication. This permits UE 120 to decode the transport block at the code block level to identify the one or more code blocks carrying the RACH communication, which reduces the amount of information that UE 120 is decodes in order to decode the RACH communication, which in turn decreases the amount of time required for the UE 120 to decode the RACH communication. Moreover, this permits UE 120 to provide HARQ feedback at the code block level such that BS 110 may retransmit individual code blocks, instead of the entire transport block, if UE 120 is unable to decode certain code blocks in the transport block. The reduces the amount of networking, processing, and memory resources that are used for the retransmissions.

Figure 10:
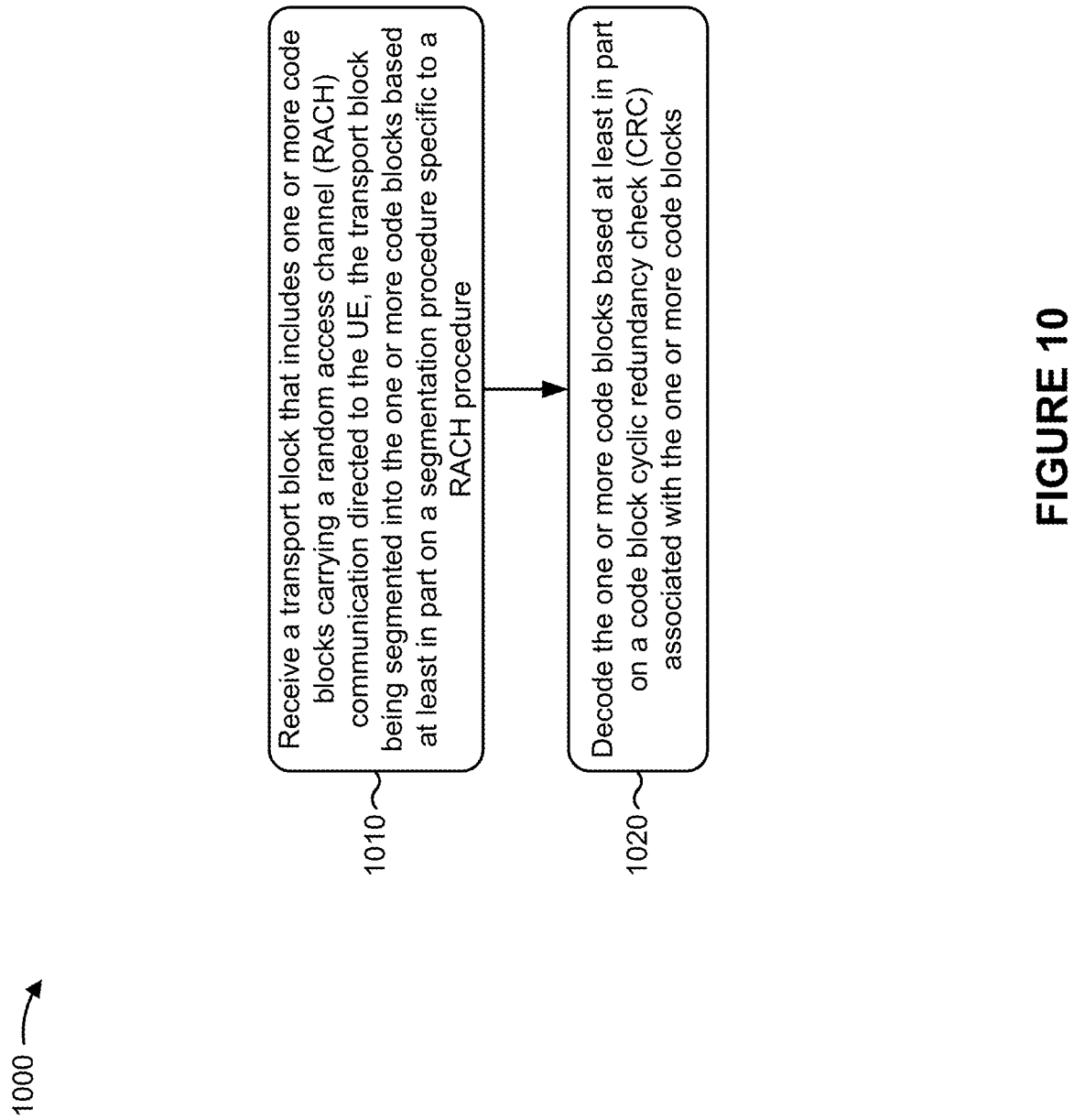
FIG. 10 is a diagram illustrating an example process performed by a UE in accordance with various aspects of the present disclosure.

FIG. 10 is a diagram illustrating an example process 1000 performed, for example, by a UE, in accordance with various aspects of the present disclosure. Example process 1000 is an example where a UE (for example, UE 120a or the like, or a combination thereof) performs operations associated with code-block-based communication for RACH.

As shown in FIG. 10, in some aspects, process 1000 may include receiving a transport block that includes one or more code blocks carrying a RACH communication directed to the UE, the transport block being segmented into the one or more code blocks based at least in part on a segmentation procedure specific to a RACH procedure (block 1010). For example, the UE (for example, using receive processor 258, controller/processor 280, memory 282, or the like, or a combination thereof) may receive a transport block that includes one or more code blocks carrying a RACH communication directed to the UE, as described above. In some aspects, the transport block is segmented into the one or more code blocks based at least in part on a segmentation procedure specific to a RACH procedure.

As further shown in FIG. 10, in some aspects, process 1000 may include decoding the one or more code blocks based at least in part on a code block CRC associated with the one or more code blocks (block 1020). For example, the UE (for example, using receive processor 258, transmit processor 264, controller/processor 280, memory 282, or the like, or a combination thereof) may decode the one or more code blocks based at least in part on a code block CRC associated with the one or more code blocks, as described above.

Process 1000 may include additional aspects, such as any single implementation or any combination of aspects described below or in connection with one or more other processes described elsewhere herein.

In a first aspect, the RACH communication includes a two-step RACH msgB communication, or a four-step RACH msg2 communication. In a second additional aspect, alone or in combination with the first aspect, the transport block includes one or more other code blocks. In a third additional aspect, alone or in combination with one or more of the first or second aspects, the one or more other code blocks include another RACH communication directed to another UE. In a fourth additional aspect, alone or in combination with one or more of the first through third aspects, receiving the transport block includes receiving the transport block on a PDSCH. In a fifth additional aspect, alone or in combination with one or more of the first through fourth aspects, the one or more code blocks and the one or more other code blocks have a same code block size. In a sixth additional aspect, alone or in combination with one or more of the first through fifth aspects, the one or more code blocks and the one or more other code blocks have different code block sizes.

In a seventh additional aspect, alone or in combination with one or more of the first through sixth aspects, the one or more code blocks are included in a code block group. In an eighth additional aspect, alone or in combination with one or more of the first through seventh aspects, the code block CRC includes a code block group CRC. In a ninth additional aspect, alone or in combination with one or more of the first through eighth aspects, decoding the one or more code blocks includes decoding the one or more code blocks based at least in part on a code block size of the one or more code blocks. In a tenth additional aspect, alone or in combination with one or more of the first through ninth aspects, the code block size is selected from one or more of candidate code block sizes. In an eleventh additional aspect, alone or in combination with one or more of the first through tenth aspects, the one or more of candidate code block sizes is indicated in a MIB communication or an RMSI communication. In a twelfth additional aspect, alone or in combination with one or more of the first through eleventh aspects, selection of the code block size, from the one or more candidate code block sizes, is indicated by a code block size index in a PDCCH.

In a thirteenth additional aspect, alone or in combination with one or more of the first through twelfth aspects, the transport block is segmented into the one or more code blocks based at least in part on a code block size threshold associated with the segmentation procedure specific to the RACH procedure. In a fourteenth additional aspect, alone or in combination with one or more of the first through thirteenth aspects, the one or more code blocks include a plurality of code blocks. In a fifteenth additional aspect, alone or in combination with one or more of the first through fourteenth aspects, process 1000 includes transmitting a HARQ acknowledgement based at least in part on decoding the plurality of code blocks.

In a sixteenth additional aspect, alone or in combination with one or more of the first through fifteenth aspects, process 1000 includes receiving a PDCCH and identifying an indication, included in the PDCCH, that the transport block does not include a four-step RACH msg2 communication. In a seventeenth additional aspect, alone or in combination with one or more of the first through sixteenth aspects, decoding the one or more code blocks includes decoding the one or more code blocks based at least in part on identifying the indication.

Figure 11:
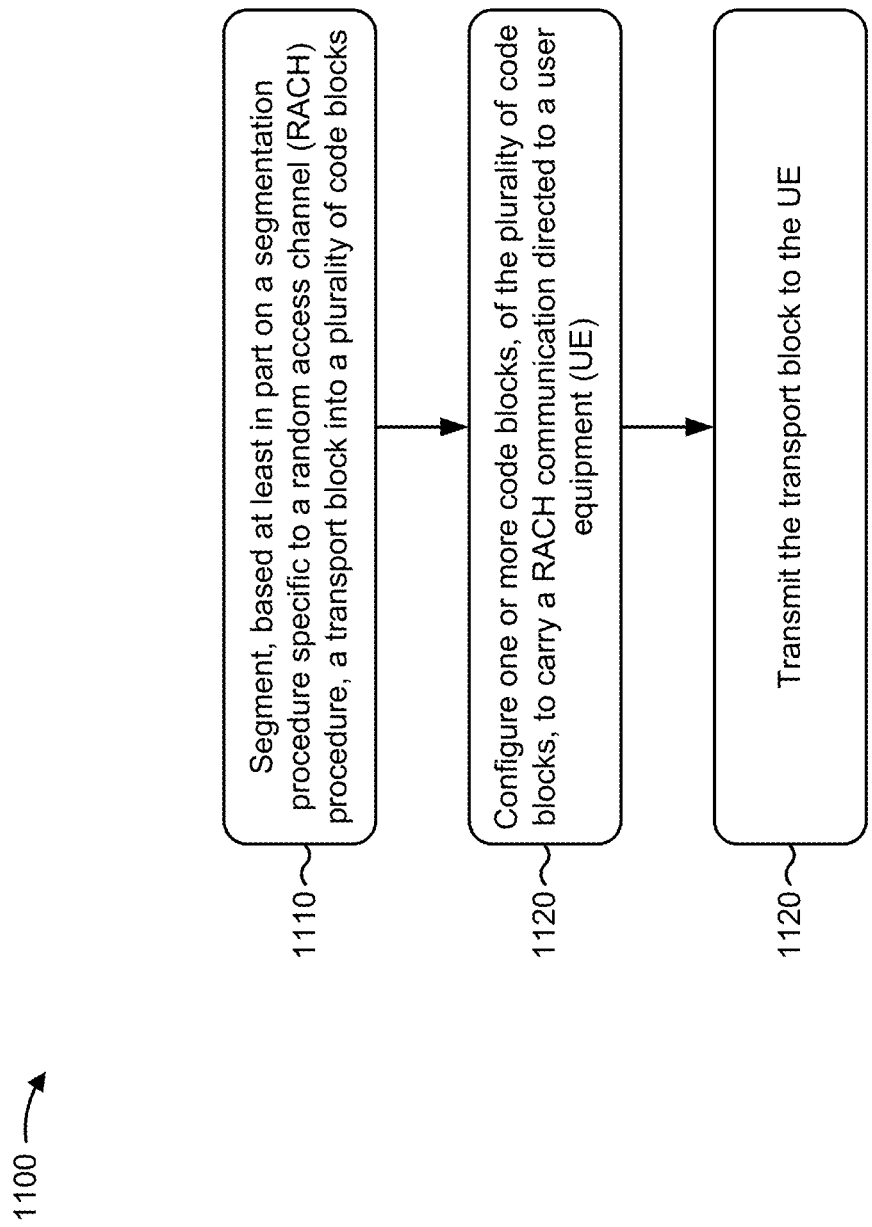
FIG. 11 is a diagram illustrating an example process performed by a BS in accordance with various aspects of the present disclosure.

FIG. 11 is a diagram illustrating an example process 1100 performed, for example, by a BS, in accordance with various aspects of the present disclosure. Example process 1100 is an example where a BS for example, BS 110 or the like, or a combination thereof) performs operations associated with code-block-based communication for RACH.

As shown in FIG. 11, in some aspects, process 1100 may include segmenting, based at least in part on a segmentation procedure specific to a RACH procedure, a transport block into a plurality of code blocks (block 1110). For example, the BS (for example, using transmit processor 220, receive processor 238, controller/processor 240, memory 242, or the like, or a combination thereof) may segment, based at least in part on a segmentation procedure specific to a RACH procedure, a transport block into a plurality of code blocks, as described above.

As further shown in FIG. 11, in some aspects, process 1100 may include configuring one or more code blocks, of the plurality of code blocks, to carry a RACH communication directed to a UE (block 1120). For example, the BS (for example, using transmit processor 220, receive processor 238, controller/processor 240, memory 242, or the like, or a combination thereof) may configure one or more code blocks, of the plurality of code blocks, to carry a RACH communication directed to a UE, as described above.

As further shown in FIG. 11, in some aspects, process 1100 may include transmitting the transport block to the UE (block 1130). For example, the BS (for example, using transmit processor 220, controller/processor 240, memory 242, or the like, or a combination thereof) may transmit the transport block to the UE, as described above.

Process 1100 may include additional aspects, such as any single implementation or any combination of aspects described below or in connection with one or more other processes described elsewhere herein.

In a first aspect, the RACH communication includes a two-step RACH msgB communication, or a four-step RACH msg2 communication. In a second additional aspect, alone or in combination with the first aspect, process 1100 includes configuring one or more other code blocks, of the plurality of code blocks, to carry another RACH communication directed to another UE, and transmitting the transport block to the other UE. In a third additional aspect, alone or in combination with one or more of the first or second aspects, transmitting the transport block includes transmitting the transport block on a PDSCH.

In a fourth additional aspect, alone or in combination with one or more of the first through third aspects, segmenting the transport block into the plurality of code blocks includes segmenting the transport block into the plurality of code blocks based at least in part on a code block size threshold associated with the segmentation procedure specific to the RACH procedure. In a fifth additional aspect, alone or in combination with one or more of the first through fourth aspects, the plurality of code blocks has a same code block size. In a sixth additional aspect, alone or in combination with one or more of the first through fifth aspects, the one or more code blocks have a different code block size relative to one or more other code blocks included in the plurality of code blocks.

In a seventh additional aspect, alone or in combination with one or more of the first through sixth aspects, configuring the plurality of code blocks includes configuring respective code block CRCs for the plurality of code blocks. In an eighth additional aspect, alone or in combination with one or more of the first through seventh aspects, the plurality of code blocks includes a plurality of code block groups. In a ninth additional aspect, alone or in combination with one or more of the first through eighth aspects, configuring the plurality of code blocks includes configuring respective code block group CRCs for the plurality of code block groups. In a tenth additional aspect, alone or in combination with one or more of the first through ninth aspects, process 1100 includes transmitting, in a PDCCH, an indication of a code block size of the one or more code blocks.

In an eleventh additional aspect, alone or in combination with one or more of the first through tenth aspects, process 1100 includes transmitting an indication of a set of candidate code block sizes. In a twelfth additional aspect, alone or in combination with one or more of the first through eleventh aspects, process 1100 includes transmitting an indication of one or more of candidate code block sizes for the one or more code blocks in a MIB communication or a RMSI communication.

In a thirteenth additional aspect, alone or in combination with one or more of the first through twelfth aspects, process 1100 includes selecting a code block size for the one or more code blocks from the one or more candidate code block sizes and transmitting, in a PDCCH, an indication of a code block size index associated with the selected code block size. In a fourteenth additional aspect, alone or in combination with one or more of the first through thirteenth aspects, process 1100 includes transmitting, to the UE and in a PDCCH, an indication that the transport block does not include a four-step RACH msg2 communication.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, or the like, or a combination thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or a combination thereof), and may be used interchangeably with "one or more." Where only one item is intended, the phrase "only one" or similar language is used. Also, as used herein, the terms "has," "have," "having," or the like, or a combination thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a transport block that includes one or more code blocks carrying a random access channel (RACH) communication directed to the UE, the transport block being segmented into the one or more code blocks based at least in part on one of a first segmentation procedure specific to a first RACH procedure or a second segmentation procedure specific to a second RACH procedure, the first segmentation procedure being different than the second segmentation procedure and the first RACH procedure being different than the second RACH procedure; and
   decoding the one or more code blocks based at least in part on a code block cyclic redundancy check (CRC) associated with the one or more code blocks.

2. The method of claim 1, wherein the RACH communication comprises:
   a two-step RACH msgB communication, or
   a four-step RACH msg2 communication.

3. The method of claim 1, wherein the transport block includes one or more other code blocks and wherein the one or more other code blocks include another RACH communication directed to another UE.

4. The method of claim 3, wherein receiving the transport block comprises receiving the transport block on a physical downlink shared channel (PDSCH).

5. The method of claim 3, wherein the one or more code blocks and the one or more other code blocks have a same code block size.

6. The method of claim 3, wherein the one or more code blocks and the one or more other code blocks have different code block sizes.

7. The method of claim 1, wherein the one or more code blocks are included in a code block group.

8. The method of claim 1, wherein decoding the one or more code blocks comprises decoding the one or more code blocks based at least in part on a code block size of the one or more code blocks.

9. The method of claim 8, wherein the code block size is selected from one or more candidate code block sizes, and wherein the one or more candidate code block sizes is indicated in a master information block (MIB) communication or a remaining minimum system information (RMSI) communication.

10. The method of claim 9, wherein selection of the code block size, from the one or more candidate code block sizes, is indicated by a code block size index in a physical downlink control channel (PDCCH).

11. The method of claim 1, wherein the transport block is segmented into the one or more code blocks based at least in part on a code block size threshold associated with the first segmentation procedure specific or the second segmentation procedure.

12. The method of claim 1, wherein the one or more code blocks comprise a plurality of code blocks and wherein the method further comprises transmitting a hybrid automatic repeat request (HARQ) acknowledgement based at least in part on decoding the plurality of code blocks.

13. The method of claim 1, further comprising:
receiving a physical downlink control channel (PDCCH); and
identifying an indication, included in the PDCCH, that the transport block does not include a four-step RACH msg2 communication, wherein decoding the one or more code blocks comprises decoding the one or more code blocks based at least in part on identifying the indication.

14. A method of wireless communication performed by a base station (BS), comprising:
segmenting, based at least in part on one of a first segmentation procedure specific to a first random access channel (RACH) procedure or a second segmentation procedure specific to a second RACH procedure, a transport block into a plurality of code blocks, the first segmentation procedure being different than the second segmentation procedure and the first RACH procedure being different than the second RACH procedure;
configuring one or more code blocks, of the plurality of code blocks, to carry a RACH communication directed to a user equipment (UE); and
transmitting the transport block to the UE.

15. The method of claim 14, wherein the RACH communication comprises:
a two-step RACH msgB communication, or
a four-step RACH msg2 communication.

16. The method of claim 14, further comprising:
configuring one or more other code blocks, of the plurality of code blocks, to carry another RACH communication directed to another UE; and
transmitting the transport block to the other UE.

17. The method of claim 14, wherein transmitting the transport block comprises transmitting the transport block on a physical downlink shared channel (PDSCH).

18. The method of claim 14, wherein segmenting the transport block into the plurality of code blocks comprises segmenting the transport block into the plurality of code blocks based at least in part on a code block size threshold associated with the first segmentation procedure specific or the second segmentation procedure.

19. The method of claim 14, wherein the plurality of code blocks has a same code block size.

20. The method of claim 14, wherein the one or more code blocks have a different code block size relative to one or more other code blocks included in the plurality of code blocks.

21. The method of claim 14, wherein configuring the plurality of code blocks comprises configuring respective code block cyclic redundancy checks (CRCs) for the plurality of code blocks.

22. The method of claim 14, wherein the plurality of code blocks comprises:
a plurality of code block groups; and
wherein configuring the plurality of code blocks comprises:
configuring respective code block group cyclic redundancy checks (CRCs) for the plurality of code block groups.

23. The method of claim 14, further comprising transmitting, in a physical downlink control channel (PDCCH), an indication of a code block size of the one or more code blocks.

24. The method of claim 14, further comprising transmitting an indication of one or more of candidate code block sizes for the one or more code blocks in a master information block (MIB) communication or a remaining minimum system information (RMSI) communication.

25. The method of claim 24, further comprising:
selecting a code block size for the one or more code blocks from the one or more candidate code block sizes; and
transmitting, in a physical downlink control channel (PDCCH), an indication of a code block size index associated with the selected code block size.

26. The method of claim 14, further comprising transmitting, to the UE and in a physical downlink control channel (PDCCH), an indication that the transport block does not include a four-step RACH msg2 communication.

27. A user equipment (UE) for wireless communication, comprising:
a memory; and
one or more processors operatively coupled to the memory, the memory and the one or more processors configured to:
receive a transport block that includes one or more code blocks carrying a random access channel (RACH) communication directed to the UE, the transport block being segmented into the one or more code blocks based at least in part on one of a first segmentation procedure specific to a first RACH procedure or a second segmentation procedure specific to a second RACH procedure, the first segmentation procedure being different than the second segmentation procedure and the first RACH procedure being different than the second RACH procedure; and
decode the one or more code blocks based at least in part on a code block cyclic redundancy check (CRC) associated with the one or more code blocks.

28. The UE of claim 27, wherein the RACH communication comprises:
a two-step RACH msgB communication, or
a four-step RACH msg2 communication.

29. A base station (BS) for wireless communication, comprising:
a memory; and
one or more processors operatively coupled to the memory, the memory and the one or more processors configured to:
segment, based at least in part on one of a first segmentation procedure specific to a first random access channel (RACH) procedure or a second segmentation procedure specific to a second RACH procedure, a transport block into a plurality of code blocks, the first segmentation procedure being different than the second segmentation procedure and the first RACH procedure being different than the second RACH procedure;

configure one or more code blocks, of the plurality of code blocks, to carry a RACH communication directed to a user equipment (UE); and transmit the transport block to the UE.

30. The BS of claim 29, wherein the RACH communication comprises:

a two-step RACH msgB communication, or a four-step RACH msg2 communication.

* * * * *